US008624657B2

(12) United States Patent
Beale et al.

(10) Patent No.: US 8,624,657 B2
(45) Date of Patent: Jan. 7, 2014

(54) SQUARING CIRCUIT, INTEGRATED CIRCUIT, WIRELESS COMMUNICATION UNIT AND METHOD THEREFOR

(75) Inventors: Christopher Jacques Beale, Tonbridge (GB); Bernard Mark Tenbroek, West Malling (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 13/541,676

(22) Filed: Jul. 4, 2012

(65) Prior Publication Data

US 2013/0027110 A1    Jan. 31, 2013

Related U.S. Application Data

(60) Provisional application No. 61/512,701, filed on Jul. 28, 2011.

(51) Int. Cl.
*G06G 7/20*    (2006.01)
(52) U.S. Cl.
USPC .......................................... 327/349; 327/356
(58) Field of Classification Search
USPC ........... 327/346–350, 355–360; 455/323, 326
See application file for complete search history.

(56) References Cited

U.S. PATENT DOCUMENTS

| 5,552,734 | A  | * | 9/1996  | Kimura  | 327/356 |
|-----------|----|---|---------|---------|---------|
| 5,581,211 | A  | * | 12/1996 | Kimura  | 327/356 |
| 5,926,408 | A  | * | 7/1999  | Kimura  | 708/835 |
| 6,549,057 | B1 |   | 4/2003  | Gilbert |         |
| 7,622,981 | B2 |   | 11/2009 | Zou     |         |
| 7,777,552 | B1 |   | 8/2010  | Gilbert |         |
| 2002/0070789 | A1 | | 6/2002  | Dathe   |         |
| 2009/0045865 | A1 | | 2/2009  | Li      |         |
| 2009/0237068 | A1 | | 9/2009  | Vora    |         |

OTHER PUBLICATIONS

Song, An MOS Four-Quadrant Analog Multiplier Using Simple Two-Input Squaring Circuits with Source Followers, pp. 841-848, vol. 25, No. 3, IEEE Journal of Solid-State Circuits, Jun. 1990.

* cited by examiner

*Primary Examiner* — Dinh T. Le
(74) *Attorney, Agent, or Firm* — Winston Hsu; Scott Margo

(57) ABSTRACT

A squaring circuit has current mode triplet metal oxide semiconductor (MOS) devices, including a first MOS device, a second MOS device and a third MOS device each having a source operably coupled to a first current source; and a fourth MOS device, a fifth MOS device and a sixth MOS device each having a source operably coupled to a second current source. The drain of first and fourth MOS device is operably coupled to a first supply, the drain of second and fifth MOS device is operably coupled to a first differential output port and the drain of third and sixth MOS device is operably coupled to a second differential output port. The gate of first, second and sixth MOS device is connected to a first differential input port, and the gate of third, fourth and fifth MOS device is connected to a second differential input port.

16 Claims, 8 Drawing Sheets

FIG. 1 – Prior Art

SQUARING CIRCUIT, INTEGRATED CIRCUIT, WIRELESS COMMUNICATION UNIT AND METHOD THEREFOR

CROSS REFERENCE TO RELATED APPLICATIONS

This application claims the benefit of U.S. provisional application No. 61/512,701, filed on Jul. 28, 2011 and incorporated herein by reference.

BACKGROUND

The field of this invention relates to an integrated circuit, a communication unit and a method for power detection. The invention is applicable to, but not limited to, an integrated circuit comprising a squaring circuit for a wireless communication unit.

In the field of wireless communication systems, power control is needed in a radio access network to allow the transceivers in a base station (referred to as a Node-B in a $3^{rd}$ generation partnership project (3GPP™) communication standard within the universal mobile telecommunication system (UMTS™)) and the transceivers in a subscriber wireless communication unit (referred to as a user equipment (UE) in 3GPP™) to adjust their transmitter output power level to take into account the geographical distance between them. The closer that the subscriber wireless communication unit (UE) is to the base station's (e.g. Node B's) transceiver, the less power the UE and the Node B's transceivers are required to transmit, for the transmitted signal to be adequately received by the other communication unit. Such a transmit 'power control' feature saves battery power in the UE and also helps to reduce the level of potential interference within the communication system. Initial power settings for the UE, along with other control information, are typically set by the information provided on a beacon physical channel in each particular communication cell. Accurate control of the output power level of such wireless communication units is typically achieved by employing a feedback path from an output of the transmitter, to route a portion of the transmit signal to processing circuitry to allow the current power level of the transmit signal to be determined, and hence any gain/attenuation adjustment required.

Furthermore, a large number of conventional radio frequency (RF) transmitters use linear power amplifiers (PAs) to enable a wireless communication unit to transmit large amounts of data within a limited frequency bandwidth Accordingly, the power efficiency of such conventional RF transmitters is usually very low, due to the low efficiency of the linear PAs used therein. Hence, linearization techniques are also often employed with the linear PAs, as an attractive alternative to conventional linear PAs within RF transmitters. The vast majority of linearization techniques require the use of feedback signals from an output of the linear PA.

Thus, for reasons of both power control and/or linearization, feedback of the radio frequency signal to be transmitted is performed, so that appropriate signal processing of the initial baseband signal, and/or components or circuits in the transmit path, can be controlled. Hence, most present day wireless transmitters include a feedback path to route the transmit signal back to a digital processing block, in order to determine a power level or linearity of the signal being transmitted. This information is used to control, for example, the gain stages of the transmitter chain. Thus, in effect, the feedback path comprises a power detector circuit/architecture.

Often the power detector circuit comprises, in effect, a down-conversion receiver to convert and attenuate the transmit radio frequency signal to a baseband output that can be digitally processed to calculate the root mean square (RMS) value of the transmit signal. Typically, the RF down-conversion low-noise amplifier (LNA) and down-conversion mixers are designed for temperature stable gain, to ensure that there is no variation in the gain of the circuit across a wide temperature range. The input signal is typically fed from a power amplifier coupler, located between the PA output and, say a duplex switch.

In the feedback path, a conversion circuit to convert the RMS signal to a DC signal, often referred to as RMS-to-DC converters, can be used. RMS-to-DC converters are used to convert the RMS (root-mean-square) value of an arbitrary signal into a quasi-DC signal that represents the true power level of the signal. It is known that some RMS-to-DC converters, use an architecture of balanced squaring cells that are capable of measuring an approximation of the power at microwave frequencies, as illustrated in FIG. 1. High performance squaring circuits generally fall into either of the following two classifications: (i) Multiplier-Circuits configured to implement the square function; or (ii) circuits that directly utilise the trans-conductance Square-Law characteristic of a MOS transistor.

The architecture 100 of FIG. 1 proposes a temperature-stabilised RMS-to-DC converter that uses wide-band, matched squaring circuits. Here, RMS-to-DC conversion is achieved by applying an input signal 105 to be measured to a first squaring cell/circuit (denoted by 'x2') 110. A voltage is generated at the output of the squaring cell/circuit and is determined by the output current signal into the load resistor whose other end is connected to a supply voltage. The voltage at the output of the first squaring cell/circuit 110 has high frequency content, which is filtered by the filter capacitor to provide a 'mean' low frequency signal into the non-inverting input of the Error-Amplifier (denoted by 'Error amp'). The feedback path 115 around the Error Amplifier, which includes the second squaring cell/circuit (denoted by 'x2') 120, forms an analogue tracking loop such that the voltage at the input of the Error-Amplifier (error-node) is nulled. As a result the signal at the output of the Error-Amplifier, which also forms the input to second squaring cell/circuit 120, represents the RMS value of the input signal 105. In this circuit, the RMS voltage is scaled by the buffer to increase the magnitude of the measured voltage for use on the power measurement system. By implementing the squaring cells/circuits 110, 120 as series-connected three-transistor multi-tanh transconductance cells, it is suggested in the literature that square law approximation from DC up to microwave frequencies can be achieved.

However, it is noted that the architecture of FIG. 1 suffers from sensitivity to DC offsets at the error amplifier input, which limits the functional dynamic range of the circuit. In order to minimize the sensitivity to DC offsets, added complexity is required to auto-zero the internal offsets. Furthermore, the architecture of FIG. 1 also suffers from output noise of the error amplifier, which is strongly dependent upon the gain in the feedback path. Since the feedback path contains a squaring function, the feedback path gain is proportional to the signal amplitude. Thus, the noise gain of the system increases for small signal levels, thereby again limiting the Dynamic Range. Notably, the analog filter included in this detector system is large and will occupy significant die area if the system is implemented on an integrated circuit.

The paper titled "An MOS Four-Quadrant Analog Multiplier Using Simple Two-Input Squaring Circuits with Source Followers", Ho-Jun Song and Choong-Ki Kim, IEEE JSSC, vol. 25, No. 3, June 1990" proposes the multiplication of two voltages, $V_1$ & $V_2$, based on the "difference" of the 'square of the sum of the two voltages' and the 'square of the difference of the two voltages', whereby:

$$Vo = (V_1+V_2)^2 - (V_1-V_2)^2 = 4 \cdot V_1 \cdot V_2 \quad [1]$$

The squaring is achieved using the square-law relationship of the drain-current, $I_D$, to gate-source voltage, $V_{GS}$, of a MOS transistor operating in the saturation region. If inputs V1 & V2 are applied to the gate and source of a MOS transistor respectively, the drain current is proportional to the square of the difference of the voltages:

$$I_D = \frac{K}{2} \cdot \left(\frac{W}{L}\right) \cdot (V_{GS} - V_T)^2 \quad [2]$$

Where, $K = \mu_0 \cdot C_{OX}$
$\mu_0$ represents the carrier mobility,
$C_{OX}$ the gate capacitance per unit area, and
$V_T$ is the threshold voltage of the MOS transistor.

The core squaring circuit 200 has two differential input voltages $V_1$ ($V_1+$ and $V_1-$) & $V_2$ ($V_2+$ and $V_2-$) and a single output current ($I_{sq}$) as shown in FIG. 2.

In FIG. 2, transistors $M_1$ & $M_2$ act as source-follower stages and transfer the input voltage ($V_2$) to the sources of $M_3$ & $M_4$ respectively. For the squaring function to be fully compliant the voltages across the source followers should be independent of the input gate signal voltage level. In practice the current in the source-followers changes with input voltage; as more current is forced to flow in the 'squaring transistors' ($M_3$ & $M_4$). In order that this effect is minimised there is the following requirement for the Width/Length ratios of the source follower transistors compared to the squaring transistors:

$$\left(\frac{W}{L}\right)_{M1,M2} \gg \left(\frac{W}{L}\right)_{M3,M4} \quad [3]$$

and for this condition:

$$I_{sq} \approx \frac{1}{4} \cdot K \cdot \left(\frac{W}{L}\right)_{M3,M4} \cdot (V_1 + V_2)^2 \quad [4]$$

According to Equation [1] above, multiplication can be achieved by subtracting the 'square of the difference' from 'the square of the sum' of the two input voltages. Therefore if a second core squaring cell is configured to realise the 'square of the difference', and if $V_1 = V_2 = V_{in}$, it is possible to configure the squaring circuit to have both differential inputs and outputs ($I_1 - I_0$), as shown in the core squaring circuit 300 of FIG. 3.

$$(I_1 - I_0) \approx \left\{K \cdot \left(\frac{W}{L}\right)_{M5,6,7,8}\right\} \cdot V_{in}^2 \quad [5]$$

However, a primary assumption in the analysis of the above circuit is that the source-follower devices ($M_1$-$M_4$) provide a constant voltage drop over the range of input signal voltages. In practice the current in the source-followers varies, and therefore the gate-source voltage varies so as to provide current for the squaring devices ($M_5$-$M_8$). The authors acknowledge that "it is one of the significant error sources for this type of multiplier". This 'approximation-error' acts in addition to other non-idealities associated with the MOS transistors, such as 'velocity-saturation', 'mobility-degradation', 'short channel effects' and 'device mismatches'.

Thus, a need exists for an improved integrated circuit and method of operation that can preferably be applied to a wideband power detector (e.g. DC to several GHz) and can be implemented in a differential configuration that is insensitive to common-mode voltages at the input, and preferably has low supply voltage (headroom) requirements (≤1.35V operation).

SUMMARY

Accordingly, the invention seeks to mitigate, alleviate or eliminate one or more of the above mentioned disadvantages, individually or in any combination. Aspects of the invention provide a squaring circuit, an integrated circuit, a wireless communication unit comprising such a squaring circuit, and a method therefor as described in the appended claims.

A squaring circuit includes a first differential input port and a second differential input port for receiving a differential input signal and a first differential output port and a second differential output port for outputting a differential output signal. The squaring circuit has: a first set of current mode triplet metal oxide semiconductor (MOS) devices comprising a first MOS device, a second MOS device and a third MOS device, each of the first MOS device, second MOS device and third MOS device having a source operably coupled to a first current source, wherein the drain of the first MOS device is operably coupled to a first supply, the drain of the second MOS device is operably coupled to the first differential output port and a drain of the third MOS device is operably coupled to the second differential output port; and a second set of current mode triplet metal oxide semiconductor (MOS) devices comprising a fourth MOS device, a fifth MOS device and a sixth MOS device, each of the fourth MOS device, fifth MOS device and sixth MOS device having a source operably coupled to a second current source, wherein the drain of the fourth MOS device is operably coupled to the first supply, the drain of the fifth MOS device is operably coupled to the first differential output port and a drain of the sixth MOS device is operably coupled to the second differential output port; wherein the gate of each of the first MOS device, second MOS device and sixth MOS device is connected to a first differential input port and the gate of each of the third MOS device, fourth MOS device and fifth MOS device is connected to a second differential input port such that the differential output current observed at the first differential output and second differential output is proportional to the differential input voltage squared.

An integrated circuit having the aforementioned squaring circuit and a wireless communication unit having the aforementioned squaring circuit are also provided.

A method for calibrating a power detector includes the following steps: calibrating a squaring circuit having a substantially constant gain response across frequency by applying one or more DC reference voltages to the input of the squaring circuit in order to produce calibrated data; calculating a DC offset and a squaring gain factor of the squaring circuit using the calibrated squaring circuit data; applying a transmit signal to the input of the squaring circuit, such that the input signal is representative of a power level of the transmit signal, and the squaring circuit is configured to produce a squared output signal; sampling the squared output signal; and calculating a detected power level using the sampled squared output signal and a calculated DC offset and squaring gain factor of the squaring circuit.

A non-transitory computer program product including executable code stored therein for calibrating a power detector is provided, where the executable code is operable for performing the aforementioned method.

These and other aspects of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION

Figure 1:
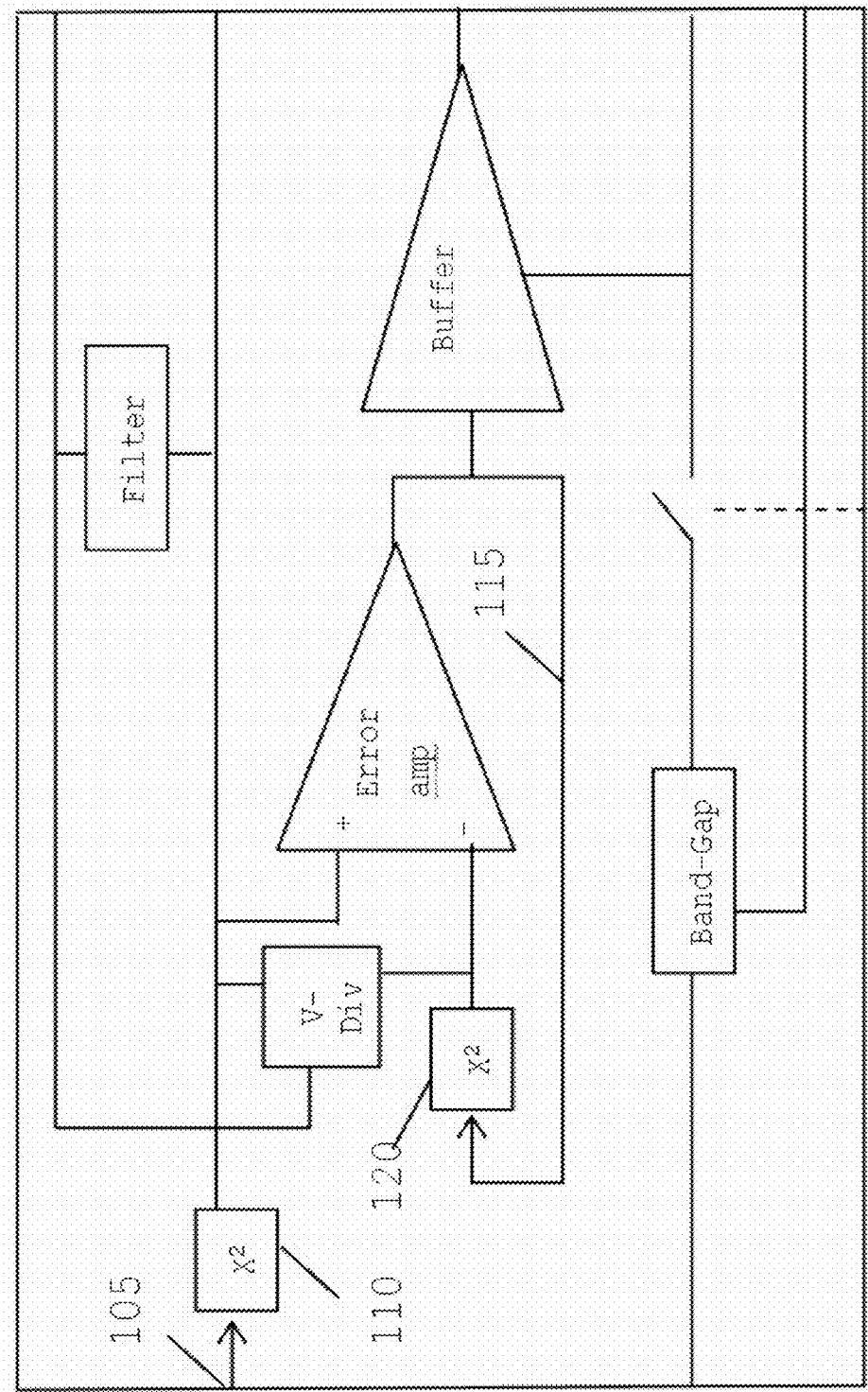
FIG. 1 illustrates a known architecture of a temperature-stabilised RMS-to-DC converter that uses wide-band, matched squaring circuits.

Examples of the invention will be described in terms of an integrated circuit for a wireless communication unit and method of power detection calibration therefor. However, it will be appreciated by a skilled artisan that the inventive concept herein described may be embodied in any type of architecture or circuit, and need not be limited to an integrated circuit or wireless communication unit, per se. In a number of applications, the adaptation of a radio frequency (RF) power detector with one or more integrated field effect transistor (FET) squaring circuit(s), filtering, averaging and a square root function operationally may combine to determine a root mean square (RMS) input voltage level; and therefore an accurate measure of the input power.

In accordance with some examples of the invention, a squaring circuit comprising a first differential input port and a second differential input port for receiving a differential input signal and a first differential output port and a second differential output port for outputting a differential output signal. The squaring circuit comprises a first set of current mode triplet metal oxide semiconductor (MOS) devices comprising a first MOS device, a second MOS device and a third MOS device, each of the first MOS device, second MOS device and third MOS device having a source operably coupled to a first current source, wherein the drain of the first MOS device is operably coupled to a first supply, the drain of the second MOS device is operably coupled to the first differential output port and a drain of the third MOS device is operably coupled to the second differential output port. The squaring circuit further comprises a second set of current mode triplet metal oxide semiconductor (MOS) devices comprising a fourth MOS device, a fifth MOS device and a sixth MOS device, each of the fourth MOS device, fifth MOS device and sixth MOS device having a source operably coupled to a second current source, wherein the drain of the fourth MOS device is operably coupled to the first supply, the drain of the fifth MOS device is operably coupled to the first differential output port and a drain of the sixth MOS device is operably coupled to the second differential output port. The gate of each of the first MOS device, second MOS device and sixth MOS device is connected to a first differential input port and the gate of each of the third MOS device, fourth MOS device and fifth MOS device is connected to a second differential input port such that the differential output current observed at the first differential output and second differential output is proportional to the differential input voltage squared.

In this manner, with sets of current mode triplet MOS devices coupled in this way, a FET squaring circuit is arranged to provide a highly accurate square-law transfer function over a wide range of frequencies. In accordance with some examples of the invention, the example FET wide-band squaring circuit may provide near constant gain for frequencies from DC to frequencies to beyond the RF signal under measurement. Thus, examples of the invention may calibrate a squaring circuit having a substantially constant gain response across frequency by applying one or more DC reference voltages to an input of the squaring circuit in order to produce calibrated data. In some examples a substantially constant gain response may encompass a gain with a variation of, say, less than 10% across a frequency range of interest of, say, 3 GHz. In some examples of the invention, an accuracy of <0.5 dB tolerance has been achieved across this frequency range.

In accordance with some examples of the invention, a power detection scheme may include a novel calibration stage that may overcome a need to design temperature stable gain and offsets of the squaring circuit and/or subsequent stages in the detector path. In some examples, the calibration stage may compensate for temperature variations of both gain & DC-offset levels, prior to each power measurement.

Figure 4:
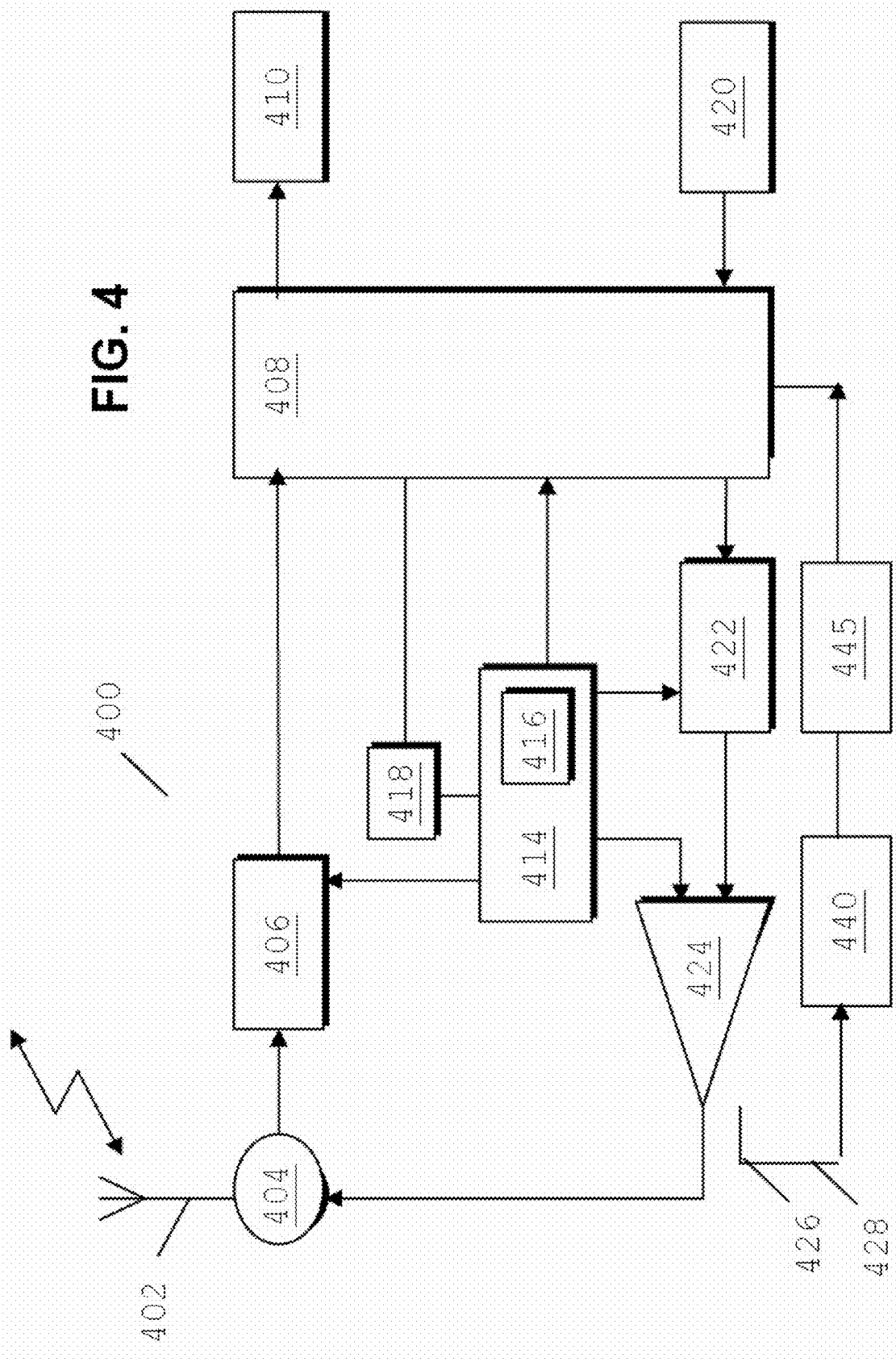
FIG. 4 illustrates a simplified example block diagram of a wireless communication unit capable of being adapted to support examples of the invention.

Referring first to FIG. 4, an example block diagram of a wireless communication unit (in the context of the present invention described with reference to a mobile subscriber unit (mobile station (MS) or user equipment (UE, in 3rd generation partnership project (3GPP™) parlance)), is shown, in accordance with an example embodiment of the invention. The wireless communication unit 400 contains an antenna 402 coupled to a duplex filter or antenna switch 404 that provides isolation between receive and transmit chains within the wireless communication unit 400.

The receiver chain, as known in the art, includes receiver front-end circuitry 406 (effectively providing reception, filtering and intermediate or base-band frequency conversion). The front-end circuitry 406 is serially coupled to a signal processor 408 (generally realised by a digital signal processor (DSP)). An output from the signal processor 408 is provided to a suitable output device 410, such as a screen or flat panel display. The receiver chain is coupled to a controller 414 that maintains overall subscriber unit control. The controller 414 is also coupled to the signal processor 408. The controller 414 is also coupled to (or comprises) a memory device 416 that selectively stores operating regimes, such as decoding/encoding functions, synchronisation patterns, code sequences, and the like. In accordance with some examples of the invention, the memory device 416 may be adapted to store information with regard to a relationship, for example in terms of one or more equations or voltage values of various circuit components or circuit elements in the feedback path, as later described.

As regards the transmit chain, this essentially includes an input device 420, such as a keypad, coupled in series through the signal processor 408 and transmitter/modulation circuitry 422 (that may include up-conversion circuitry and amplifier and filtering stages) and a power amplifier 424 to the antenna 402. The transmitter/modulation circuitry 422 and the power amplifier 424 are operationally responsive to the controller 414. The output of the power amplifier 424 is connected to a coupler 426, coupled to a detector path 428 arranged to sample and feed back a portion of the signal output from the power amplifier 424. The fed back signal is input to a radio frequency (RF) down-conversion circuit 440 to convert the sampled signal to base band and input the base band sampled signal to a digital base band (DBB) processor 445. In this example embodiment, the RF down-conversion circuit 440 comprises a squaring block that outputs a baseband signal, where this baseband signal only contains the amplitude information of the RF signal for amplitude detection. The output of the DBB processor 445 can be input to either the signal processor 408 (for further processing of the signal or results therefrom) as shown, or input to the transmitter/modulation circuitry 422 to facilitate control of, say, gain and/or phase-shift stages to set a transmit power level or transmit linearity of signals to be radiated from the antenna 402 and/or output from the power amplifier 424.

The signal processor in the transmit chain may be implemented as distinct from a different signal processor in the receive chain. Alternatively, a single processor may be used to implement processing of both transmit and receive signals, as shown in FIG. 4. Clearly, the various components within the wireless communication unit 400 can be realised in discrete or integrated component form, with an ultimate structure therefore being merely an application-specific or design selection.

In accordance with examples of the invention, the RF down-conversion circuit 440 and DBB processor 445 have been adapted to down convert the sampled fed-back portion of the signal output from the power amplifier 424 and digitally process the sample to calculate the RMS input voltage; and therefore Input Power.

In accordance with some example embodiments, only one (room-temperature) factory-calibration is required for each frequency band supported by the radio frequency transceiver (communication unit/RF IC) in order to establish the fixed losses in the detector signal path 428 from the PA output to a squaring-circuit input.

Figure 5:
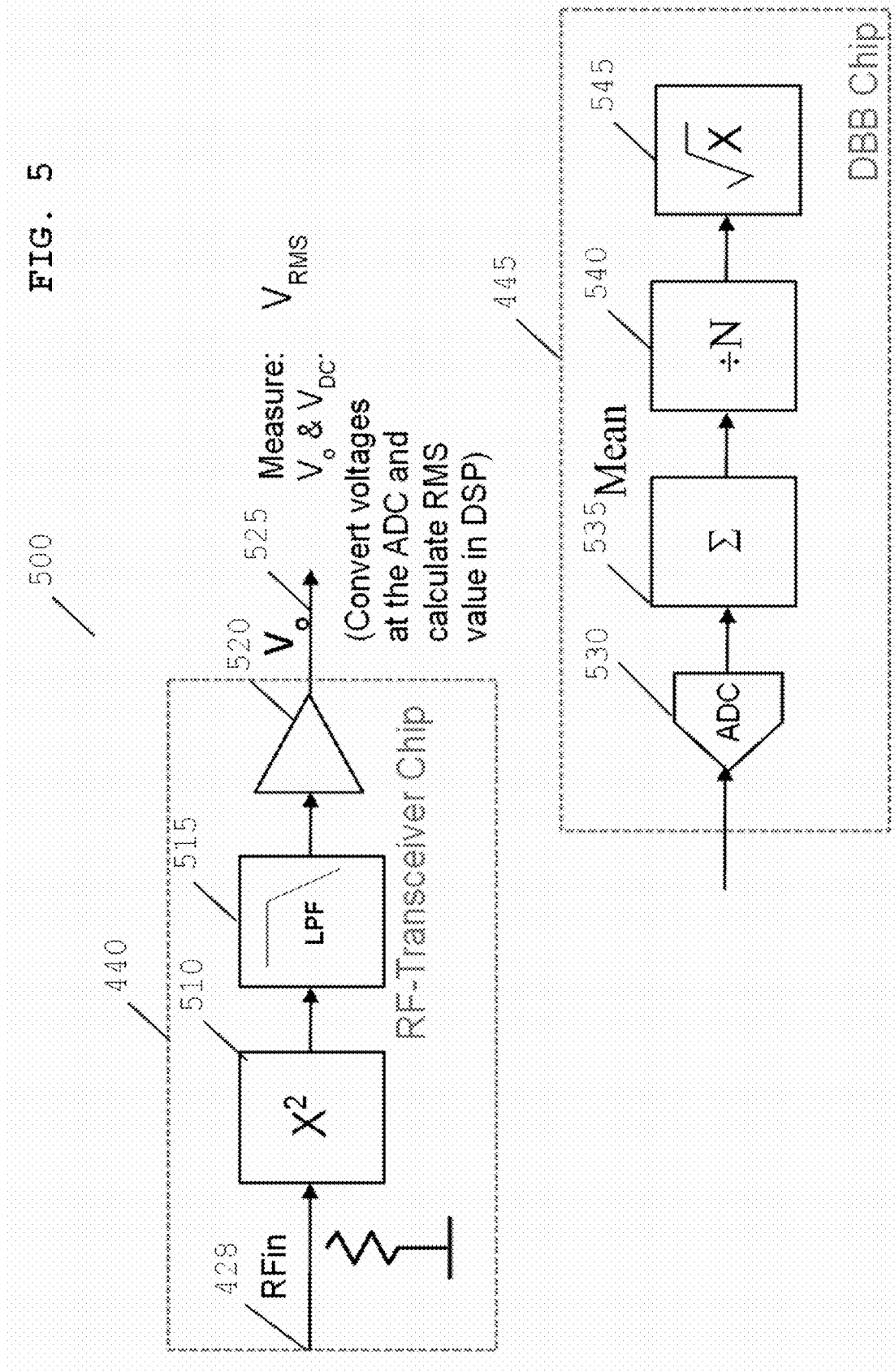
FIG. 5 illustrates a simplified example block diagram of a RF down-conversion circuit and DBB processor capable of being adapted to support examples of the invention.

In some example embodiments, and referring now to the example feedback circuit 500 of FIG. 5, the power-detector feedback path 428 of FIG. 4 may be partitioned between a radio frequency (RF) transceiver Integrated Circuit (IC)/chip down-conversion circuit 440, and a Digital Base-Band (DBB) processor Integrated Circuit (IC)/chip 445. In alternative example embodiments, the power-detector feedback path 428 of FIG. 4 may be performed in a single chip or may be partitioned in some other way. The RF transceiver IC 440 comprises the power-detector feedback path 428 feeding the feedback signal RFin into a wide-band squaring function (denoted by 'X$^2$') 510. The output of the wide-band squaring function is input to a low-pass filter (LPF) 515 to remove the high-frequency terms and the filtered signal is then applied to a fixed gain & temperature stable buffer 520 that scales the squared and filtered input signal for reasons of improving the SNR; e.g. it uses as much of the ADC input range as is practically possible. The output of the RF transceiver IC 440 comprises a measured output voltage $V_o$ and dc voltage $V_{dc}$ 525.

The DBB IC 445 is arranged to perform the averaging (mean) and square root functions; the squaring having been performed in the RF transceiver. The DBB IC 445 receives the output from the RF transceiver IC 440 and comprises an analogue-to-digital converter (ADC) 530, operably coupled to a mean-determination function/logic circuit, which in one example is a summing function (denoted by 'Σ') 535 followed by dividing logic (denoted by '÷N') 540. In the example embodiment the ADC function used for the power detector is arranged to re-use the receive signal path ADC (within block 406). This approach is possible in time division duplex (TDD) systems and saves an additional ADC. In alternative embodiments, it is possible to use a separate ADC component for the power detector function. The output from the mean-determination function/logic circuit is provided to a square-root function (denoted by '√X') 545 to produce a digital representation of the power amplified signal (e.g. output from power amplifier 424 of FIG. 4). In this manner, the DBB IC 445 is used to convert an analogue output of the filtered squaring-path 525 to a digital domain, prior to calculating the equivalent input power in signal processor 408 of FIG. 4.

In some examples, the wide-band squaring function 510 and associated filtering 515 create a low-frequency (squared) representation of the RF signal envelope; to be employed in the RMS detector measurement. The low-frequency signal is subsequently processed using, for example, a digital signal processor (DSP), or dedicated averaging & square-root function 535, 540, in order to determine the RMS value of the original input signal/input power.

Figure 6:
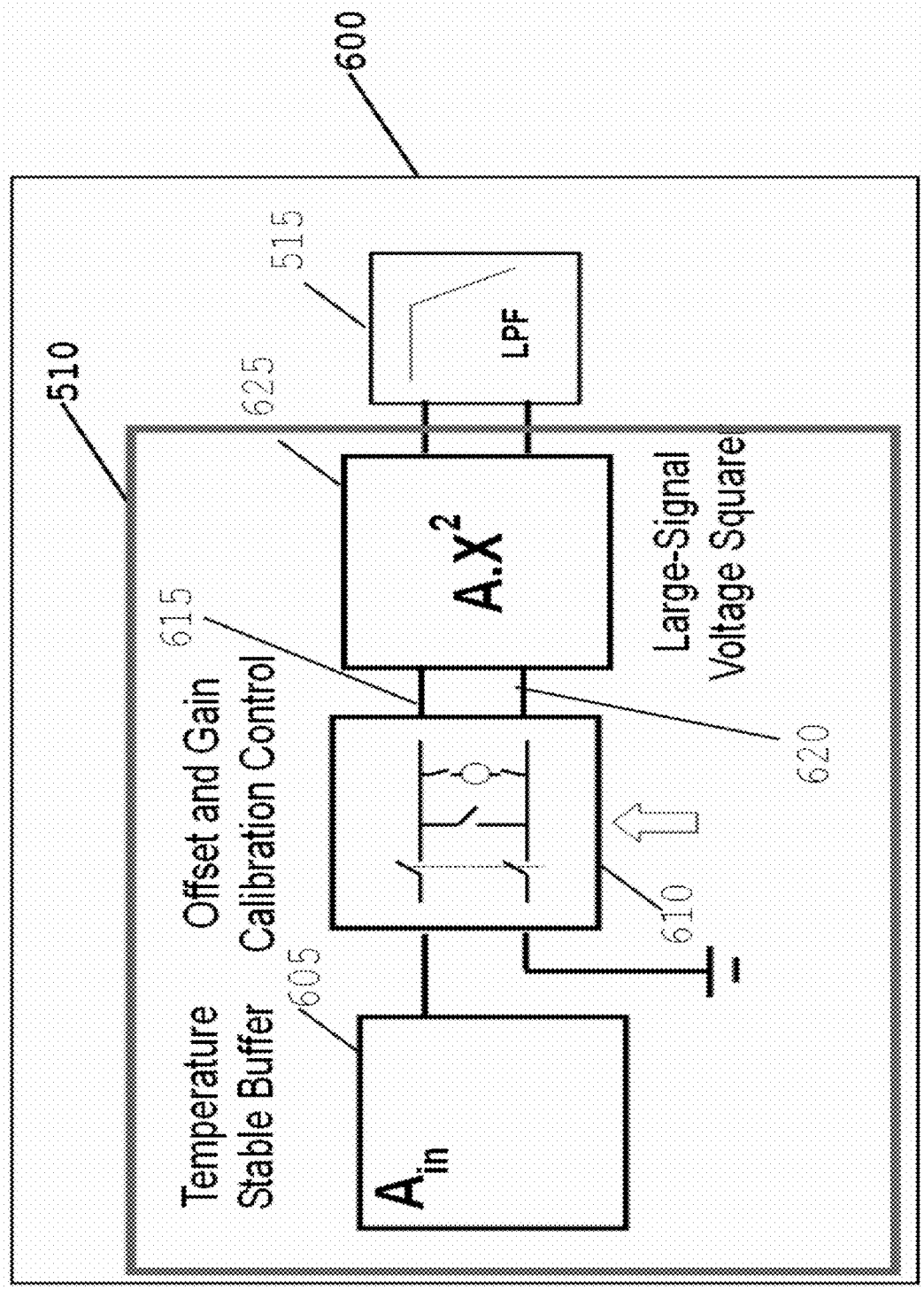
FIG. 6 illustrates a simplified example block diagram of a squaring circuit adapted to support examples of the invention.

In some examples, a calibration scheme as illustrated in FIG. 6, combined with the wide-band squaring circuit 510 of FIG. 5 may be arranged to compensate for significant signal path gain and offset variations with temperature. In this manner, the need for rigorous temperature compensated biasing is advantageously removed, which, in turn, simplifies the complexity of the RMS detection path circuitry in, for example, DBB IC 445. In some examples, the calibration reference signal comprises one or more DC voltages, such as a zero volt and a known non-zero DC voltage.

FIG. 6 illustrates a simplified example block diagram of an integrated circuit 600 comprising a wide-band squaring circuit 510 adapted to support examples of the invention. The wide-band squaring circuit 510 comprises a temperature stable buffer (denoted by '$A_{in}$') 605 arranged to receive, for example, the power-detector feedback path 428 of FIG. 4 providing the feedback signal into the wide-band squaring function 510, which in turn provides an output to an offset and gain calibration control circuit 610. In addition to providing temperature stable gain, the input buffer provides a high level of isolation from the coupler path; specifically during the calibration phases. Although the gain and isolation of this buffer are employed in this example embodiment, it is contemplated that in other applications, for example in other systems, the buffer may not be required. In accordance with examples of the invention, the offset and gain calibration control circuit 610 is configured as a differential arrangement, with the inputs comprising the output from the temperature stable buffer 605 and a second stable power supply, for example ground. In this example, the offset and gain calibration control circuit 610 outputs are connected to the differential input of the squaring circuit. A main aspect of the squaring circuit with a differential input circuit stage is that the squaring function is insensitive to any common-mode signal input that may be present on the input bias voltage; being common to both inputs of the squaring circuit. In one example, the differential arrangement of the offset and gain calibration control circuit 610 is configured with low voltage headroom requirements, for example ≤1.35V operation. The offset and gain calibration control circuit 610 outputs a differential signal, i.e. first signal 615 and second signal 620 (from which the differential therebetween can be determined) to a wideband large-signal voltage squarer (denoted by 'A.X²') 625, which in turn outputs a squared representation of the feedback signal to low-pass filter 515. In one example of the wideband large-signal voltage squarer 625, a simple circuit design may be employed to provide a wideband frequency response from DC to several GHZ, as illustrated in FIG. 7.

Figure 3:
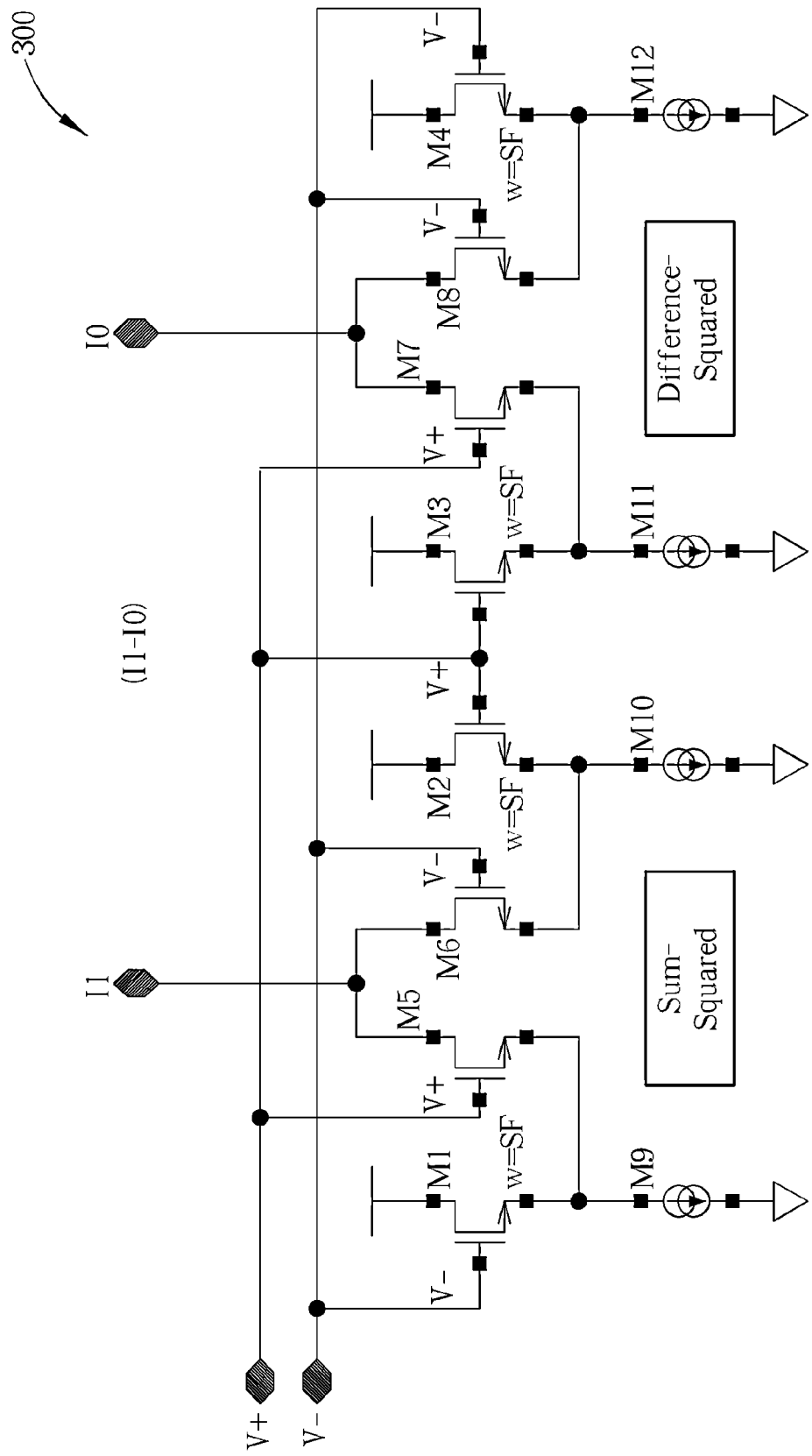
Figure 7:
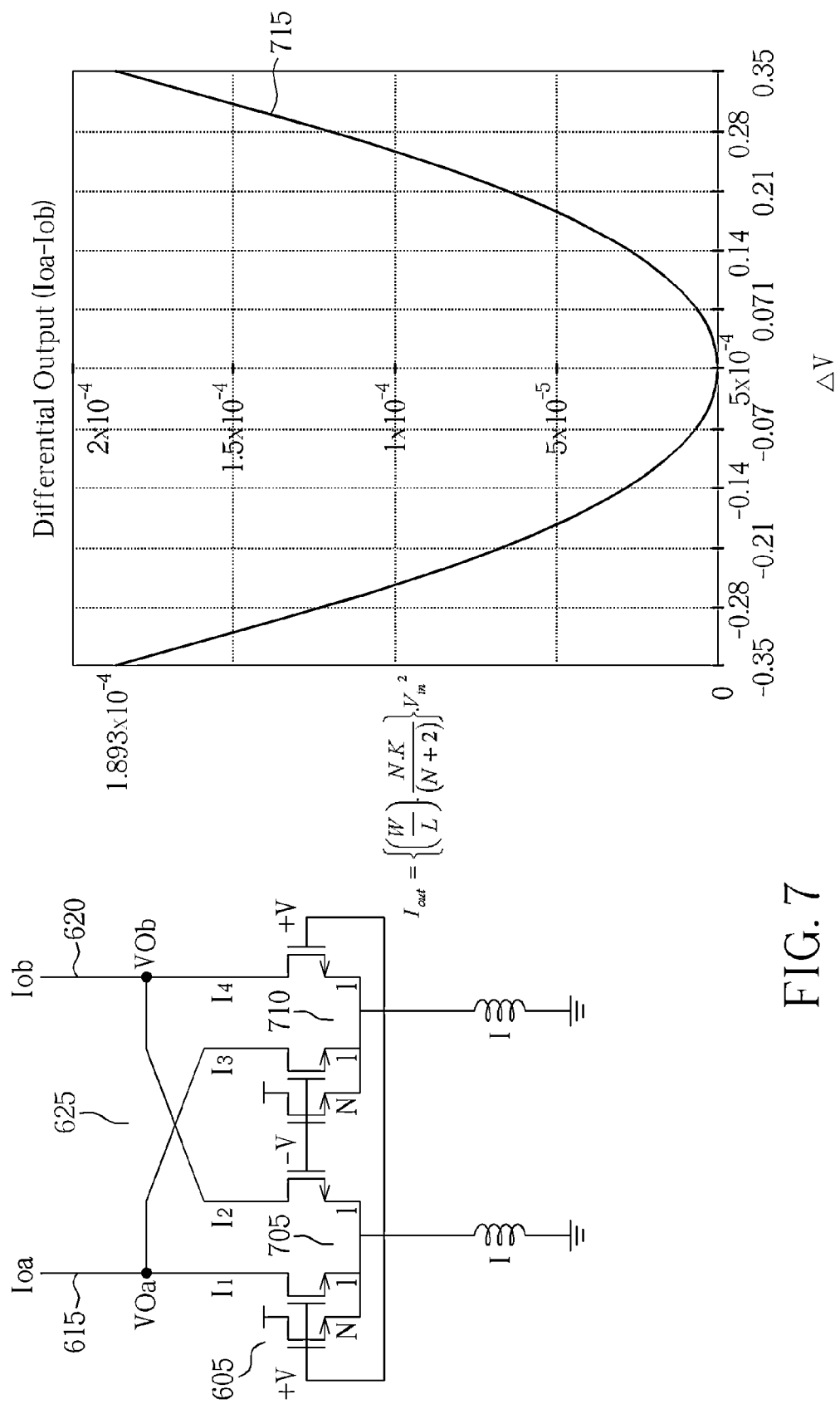
FIG. 7 illustrates an example squaring circuit capable of being adapted to support examples of the invention.

Referring now to FIG. 7, an example squaring circuit 625 that is capable of being adapted to support examples of the invention is illustrated. FIG. 7 illustrates one example circuit. The example circuit comprises two sets of triplet MOS devices, i.e. first set of triplet MOS devices 705 and second set of triplet MOS devices 710, which functions as a true squaring circuit and this particular triplet configuration of devices 710, although it may appear similar to a mixer core, actually realises an 'un-conditional' Square-Law and is different to any published circuit configuration. For example the topology shown as prior-art in FIG. 3 requires four current sources, each connected to the tail of a FET differential pair, having substantially different device sizes. Within each differential pair the larger device has its drain connected to the positive supply and the drain of the smaller device connects to one of the two circuit outputs. In the exemplary circuit there are only two current sources where each connects to the sources of three FET having similar sizes.

Figure 2:
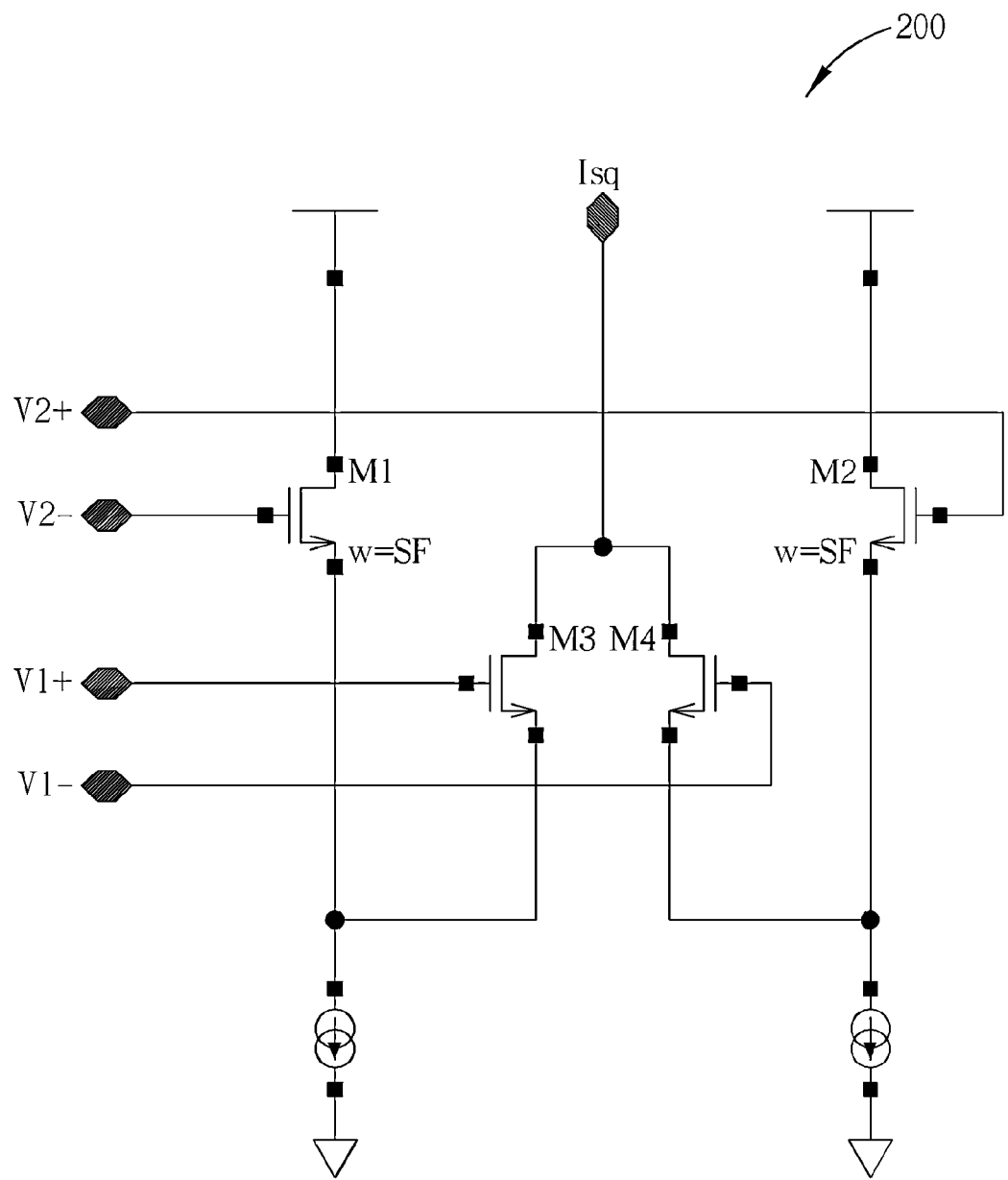
FIG. 2 and FIG. 3 illustrate a further known architecture of a squaring circuit.

The exemplary design does not make approximations and the square law characteristic is limited only by the same non-idealities of the MOS transistors, which cause the voltage-to-current characteristic to deviate from that described by equation [6] below. Thus, and advantageously in this exemplary design, the triplet MOS devices do not need to be large to achieve an ideal square-law; thereby saving current and area compared to the known prior art of FIG. 2 and FIG. 3.

The inventors of the present invention have determined that a circuit with similar size devices in sets of triplets 705 & 710 as shown, provides a good agreement to a square law response. In some example embodiments, the circuit may be configured with N=1, which works equally well. In this specific example, the circuit is configured with N=2 as it may allow more output gain whilst meeting a particular power budget. In essence, increasing 'N' increases the standing current in the supply connected devices. However, increasing 'N' does not increase the Gain by N-times; since Gain or Iout_diff is proportional to "N/(N+2)", for fixed K. Conversely, in other examples, the circuit may be configured with N=½ or ¼, and, thus, any scaling value of 'N' may be used.

Hence, when applied in a differential mode arrangement, the circuit shown in FIG. 7 is ideally suited to function as a squarer module in a feedback path, such as the feedback path 418 of FIG. 4.

As illustrated in graph 715, subsequent mathematical analysis, based on an expression for the trans-conductance of a saturated MOS device, confirms that the circuit advantageously provides an unconditional square law, which is thus limited only by the square law characteristic of the MOS devices.

In some examples, the simple and differential current-mode circuit configuration has the advantage of low parasitic capacitance and therefore wide-bandwidth. In some examples, the use of six similar-sized MOS devices makes the circuit suitable for a low voltage headroom. Thus, unlike a Gilbert-cell Multiplier the signal squaring core all operate at the same common-mode voltage, as there are no stacked signal-handling transistors. In this manner, the supply headroom may be configured to support only the 'current-sources', 'active squaring core' and output load.

The prior art is known to suffer from a sensitivity to DC offsets at the error node, which limits the functional dynamic range of the circuit and/or increases the complexity of the circuit by employing auto-zero offsets. In contrast, example circuit of the invention has the same level of DC offsets but is advantageously configured such that the circuit is relatively insensitive to DC offsets that can be easily calibrated out.

The prior art circuit of FIG. 1 also suffers from output noise of the 'closed-loop detector', which is strongly dependent upon input signal level, thereby again limiting the dynamic range at lower input levels. More specifically with the closed loop architecture the output noise is dependent on input signal level; being particularly poor for small input levels. In contrast, example embodiments of the squarer circuit utilises an open-loop architecture with fewer components and therefore less noise. The example embodiments of the squarer circuit is only limited by a fixed output noise; being independent of input signal level.

In examples of the invention, accurate determination of the instantaneous 'squaring-gain' allows the input RMS voltage, and therefore the input power, to be calculated independent of temperature.

In FIG. 7, equal tail currents, I, provide the bias to each set of current mode triplets. The DC currents are shared between the devices according to the device size ratios. If the smallest unit MOS device has stripe width, W and stripe length, L, then the static device current under zero volt DC or equal input static conditions (where +V=−V), is described by [6]. Also the devices having size multipliers of N will be biased at a current that is N-times greater.

$$I_{D_0} = \frac{K}{2} \cdot \left(\frac{W}{L}\right) \cdot (V_{GS_0} - V_T)^2 \qquad [6]$$

Where, $K=\mu_0 \cdot C_{OX}$ $\mu_0$ represents the carrier mobility, $C_{OX}$ the gate capacitance per unit area and $V_T$ is the threshold voltage of the MOS transistor.

Similarly the above equation can be re-written as:

$$I_{D_0} = \frac{K}{2} \cdot \left(\frac{W}{L}\right) \cdot (V_{OV_0})^2 \qquad [7]$$

Where, $V_{OV_0} = (V_{GS_0} - V_T)|_{[+V]=[-V]}$

On applying a differential input voltage the current is steered between the transistors within each set of MOS triplet devices 705 and 710. The resulting differential output current is equally described by the following expressions in equations [8]-[11]:

If the differential input voltage is expressed as:

$$V_{in} = ([+V] - [-V]) \qquad [8]$$

and the differential output current is expressed as:

$$I_{out} = (I_{oa} - I_{ob}) \qquad [9]$$

the squaring transfer characteristic can be expressed in several ways, for example:

$$I_{out} = \left\{\left(\frac{W}{L}\right) \cdot \frac{N \cdot K}{(N+2)}\right\} \cdot V_{in}^2 \qquad [10]$$

and $$I_{out} = \left\{\frac{2 \cdot N \cdot I}{V_{OV_0}^2 \cdot (N+2)^2}\right\} \cdot V_{in}^2 \qquad [11]$$

Where, 'I' represents the tail current in each of the two current sources of FIG. 7.

The previous analysis assumed an ideal (V→I) square law for the saturated MOS devices and predicts a large signal output square law. Notably, the prediction is totally compliant to equation [12] below:

$$I_{out} = A \cdot V_{in}^2 \qquad [12]$$

where: 'A' is the squaring-gain.

A skilled artisan will appreciate that in other applications, alternative functions/circuits/devices and/or other techniques may be used.

In existing power detector calibration techniques, it is known that the squaring circuit gain & DC-offsets are both highly temperature dependent. To address this problem, it is common in known power detection architectures to design complex circuits that include temperature compensation, which are required to maintain high accuracy of the power detection measurement over a wide range of operating conditions, such as a wide temperature range.

The proposed calibration scheme, together with the proposed wide-band squaring circuit, compensates for significant signal path gain and offset variations with temperature. The need for rigorous temperature compensated biasing is removed which, in turn, simplifies the complexity of the detection path circuitry.

Figure 8:
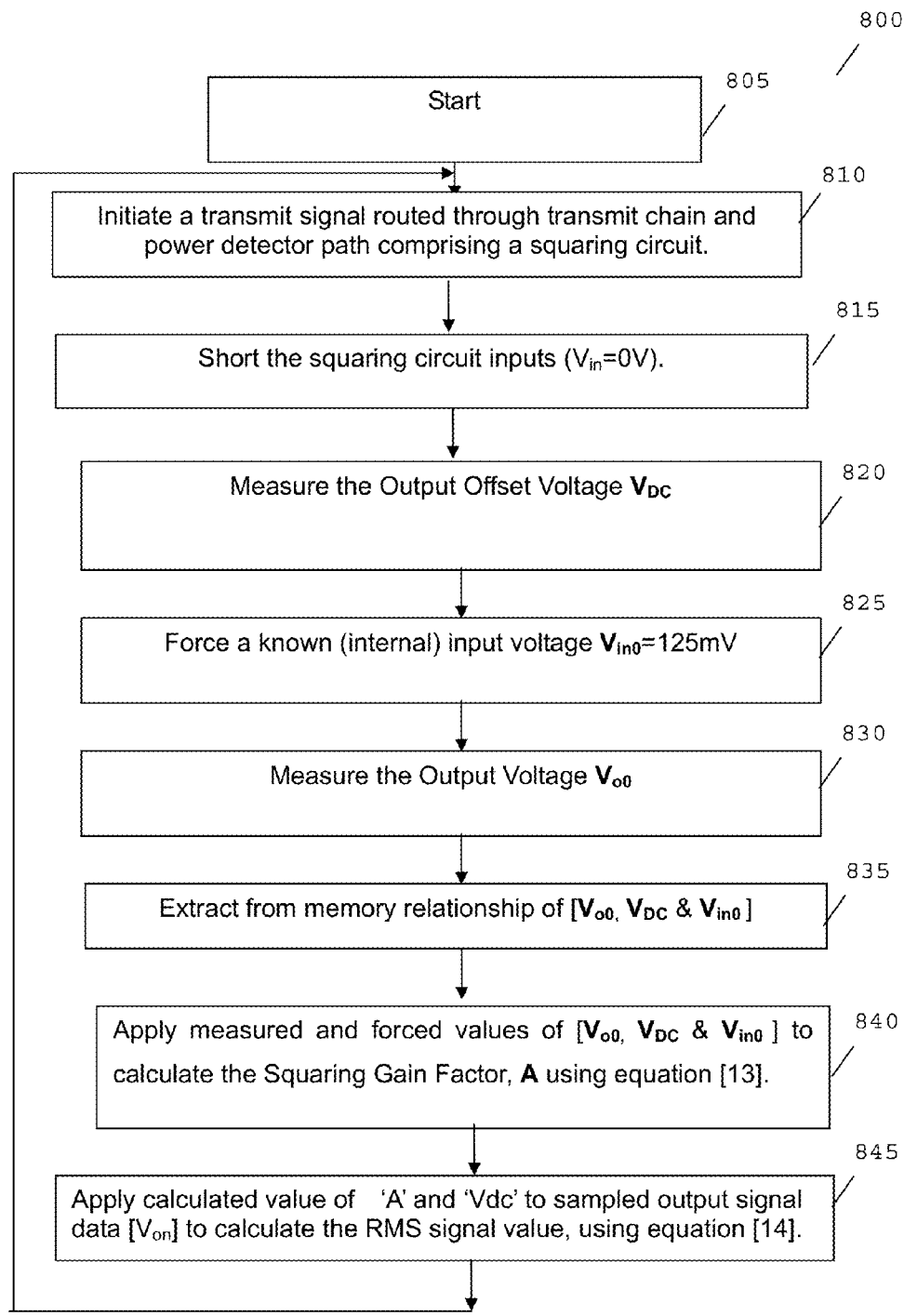
FIG. 8 illustrates an example flowchart of calibrating a power detector to support examples of the invention.

Referring now to FIG. 8, a flowchart 800 illustrates an example method of calibrating a power detector. Although, in one example, the power detector calibration method of FIG. 8 is described with respect to a fully differential squaring circuit, in other examples the method may be applied to a single-ended squaring circuit. In example embodiments of the present invention, the signal path Gain ($A_{in}$), prior to the squaring circuit input, is designed to be insensitive to temperature & frequency, since this gain cannot be compensated for. However, in example embodiments of the present invention, it is also known that the square Law gain factor, 'A', is constant over the input signal range. It is also known that the value of 'A', calculated from a DC calibration routine, is the same as the value of 'A' at radio frequencies, thus the method may be applied for calibrating a squaring circuit having a substantially constant frequency response gain from DC to radio frequencies.

In one example of the present invention, the Calibration procedure in FIG. 8 may be employed during a power measurement, which advantageously compensates for such temperature variations in, and subsequent to, the squaring circuit. In one example embodiment, and in order to meet the required power measurement accuracy over the specified temperature range, a DC Offset & Gain calibration/measurement is sequenced at the beginning of each power measurement, to calculate/calibrate, for example, an instantaneous gain or offset of an open-loop detector path, such as detector path 428 of FIG. 4.

By performing a power detection open-loop calibration-phase measurement, an accurate determination of the instantaneous squaring gain can be made. Thereafter, by determining average output voltages during an open-loop measurement-phase, and applying a previously determined relationship between the respective measured values through the calibration-phase, for example as indicated in equations [8]-[11] above, it is possible to calculate the input RMS voltage; and therefore the input power. Advantageously, the calculation (measurement) result is largely independent of temperature.

Hence, in one example, the method of calibrating a power detector starts at step 805 and moves on to step 810 whereby a transmit signal that is routed through the transmitter chain is initiated and a portion thereof sampled and routed along a detector feedback path, such as detector feedback path 428 of FIG. 4, which comprises a squaring circuit, such as squaring circuit 625 of FIG. 6 and FIG. 7.

The proposed method involves, predominantly, a two-step process. A first 'calibration' comprises shorting the squaring circuit differential inputs ($V_{in}$=0V), as in step 815 and the output offset voltage $V_{DC}$ of the squaring circuit measured, as shown in step 820. Thereafter, a known (internal) input voltage $V_{in0}$ is applied to the squaring circuit, such as $V_{in0}$=125 mV, as in step 825, and the output voltage $V_{o0}$ of the squaring circuit measured, as shown in step 830. A relationship between the various values is then extracted in step 835 from, say, a memory element, such as memory 418 of FIG. 4. In the illustrated example, the relationship is shown in equation [13] below:

$$A = \frac{(V_{o0} - V_{DC})}{V_{in0}^2} \qquad [13]$$

The measured and forced values are then applied, in step 840, with the extracted knowledge of the relationship between [$V_{o0}$, $V_{DC}$ & $V_{in0}$] in order to calculate the squaring gain factor, 'A', using equation [13].

A second measurement-phase is then employed, which uses the results of the calibration phase. In this second measurement-phase, the calculated values for 'A' and $V_{DC}$ are then applied, in step 845, to the sampled output signal data [$V_{on}$] in order to calculate the RMS signal value. In some examples, the sampled values are taken during a number, of transmission bursts. In some examples, the application of the calculated value for 'A' may use, for example, equation [14] below, as follows:

$$V_{rms} = \sqrt{\operatorname{mean}(V_{in}^2)} = \sqrt{\frac{1}{N}\left[\sum_{n=1}^{N}\frac{(V_{o_n} - V_{DC})}{A}\right]} \qquad [14]$$

Where:
A: Gain Factor
$V_{in}$: Input Voltage
$V_o$: Output Voltage
$V_{DC}$: DC Offset Voltage Although aspects of the invention have been described with reference to using equation [13] and equation [14] for the calibration of the power detector, it is envisaged that in other implementations, such as an alternative squaring module circuit to that illustrated in FIG. 7, one or more different equations may be used, dependent upon the circuit layout and components used therein.

In some examples, some or all of the steps illustrated in the flowchart of FIG. 8 may be implemented in hardware and/or some or all of the steps illustrated in the flowchart may be implemented in software.

Although examples of the invention have been described with reference to an RF power detector employed in an RF transmit IC, it is envisaged that the inventive concept may be applied in alternative power detector applications that are not necessarily limited to a radio frequency power detector and/or an IC-based implementation. Although examples of the invention have been described with reference to a FET-based squaring circuit implementation, it is envisaged that the inventive concept may be applied in alternative, non FET-based, power detector/squaring circuit applications.

Thus, the hereinbefore examples provide a circuit, for example an integrated circuit, comprising an RF power detector, an apparatus, for example a wireless communication unit adapted for performing power detection and a method for power detection. In particular, the hereinbefore examples of apparatus and methods are capable of RF power detection using integrated field effect transistor (FET) squaring circuit, filtering, averaging and a square root function that combine to determine the RMS input voltage; and therefore an accurate measure of the input power.

In one example, a power detection method includes a novel calibration stage, which overcomes a need to design temperature stable gain and offsets of the squaring circuit and subsequent stages in the detector path. The calibration stage may also compensate for temperature variations of both gain & DC-offset, prior to each power measurement. In one example, the wideband (FET-based) squaring circuit may provide a highly accurate square-law transfer function over a wide range of frequencies. In some examples, the wide-band squaring circuit may provide 'near constant gain' for frequencies from DC to frequencies beyond the RF signal under measurement. In some examples of the present invention, a squaring signal path and associated filtering may create a low-frequency (squared) representation of the RF signal envelope, which is subsequently processed using a digital signal processor (DSP), or dedicated averaging & a square-root function, in order to determine the RMS value of the original input signal.

In particular, it is envisaged that the aforementioned inventive concept can be applied by a semiconductor manufacturer to any integrated circuit comprising a power detector. Furthermore, it is further envisaged that, for example, the inventive concept may be applied by a semiconductor manufacturer in a design of a stand-alone power detector device, or application-specific integrated circuit (ASIC) and/or any other sub-system element.

It will be appreciated that, for clarity purposes, the above description has described embodiments of the invention with reference to different functional units and processors. However, it will be apparent that any suitable distribution of functionality between different functional units or processors, for example with respect to the squaring circuit may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as field programmable gate array (FPGA) devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc., do not preclude a plurality.

Thus, an improved circuit, for example an integrated circuit, comprising an RF power detector, an apparatus, for example a wireless communication unit adapted for performing power detection and a method for power detection have been described, wherein the aforementioned disadvantages with prior art arrangements have been substantially alleviated.

What is claimed is:

1. A squaring circuit comprising a first differential input port and a second differential input port for receiving a differential input signal and a first differential output port and a second differential output port for outputting a differential output signal, wherein the squaring circuit comprises:
    a first set of current mode triplet metal oxide semiconductor (MOS) devices comprising a first MOS device, a second MOS device and a third MOS device, each of the first MOS device, second MOS device and third MOS device having a source operably coupled to a first current source, wherein the drain of the first MOS device is operably coupled to a first supply, the drain of the second MOS device is operably coupled to the first differential output port and a drain of the third MOS device is operably coupled to the second differential output port; and
    a second set of current mode triplet metal oxide semiconductor (MOS) devices comprising a fourth MOS device, a fifth MOS device and a sixth MOS device, each of the fourth MOS device, fifth MOS device and sixth MOS device having a source operably coupled to a second current source, wherein the drain of the fourth MOS device is operably coupled to the first supply, the drain of the fifth MOS device is operably coupled to the first differential output port and a drain of the sixth MOS device is operably coupled to the second differential output port;
    wherein the gate of each of the first MOS device, second MOS device and sixth MOS device is connected to a first differential input port and the gate of each of the third MOS device, fourth MOS device and fifth MOS device is connected to a second differential input port such that the differential output current observed at the first differential output and second differential output is proportional to the differential input voltage squared.

2. The squaring circuit of claim 1 wherein the first set of triplet metal oxide semiconductor (MOS) devices and the second set of triplet metal oxide semiconductor (MOS) devices are of substantially the same size.

3. The squaring circuit of claim 1 wherein the gate of one of the first set of current mode triplet MOS devices has a different track width to length ratio (W/L) to the gates of the other MOS devices from the first set of current mode triplet MOS devices and a gate of one of the second set of current mode triplet MOS devices has a different track width to length ratio (W/L) to the gates of the other MOS devices of the second set of current mode triplet MOS devices.

4. The squaring circuit of claim 3 wherein the gate of the first MOS device has a different track width to length ratio than that of the gates of the second MOS device and third MOS device, and a gate of the fourth MOS device has a different track width to length ratio than that of the gates of the fifth MOS device and sixth MOS device.

5. The squaring circuit of claim 4 wherein the track width to length ratio of a gate of the first MOS device is a factor (N-times) greater than that of the gates of the second MOS device and third MOS device, and a gate of the fourth MOS device has a track width to length ratio (N-times) greater than that of the gates of the fifth MOS device and sixth MOS device.

6. The squaring circuit of claim 5 wherein the factor (N) is less than, equal to, or greater than one.

7. The squaring circuit of claim 3 wherein the gates of the second, third, fifth and sixth MOS devices have substantially the same sizes and track width to length ratios.

8. The squaring circuit of claim 3 wherein the gate of one of the first set of current mode triplet MOS devices has a track width to length ratio (W/L) of substantially twice that of the gates of the other MOS devices from the first set of current mode triplet MOS devices and a gate of one of the second set of current mode triplet MOS devices has a track width to length ratio (W/L) of substantially twice that of the gates of the other MOS devices of the second set of current mode triplet MOS devices.

9. The squaring circuit of claim 1 wherein the squaring circuit further comprises an offset and gain calibration control circuit configured to provide calibration reference signals to the squaring circuit differential inputs.

10. The squaring circuit of claim 9 wherein the calibration reference signals comprises at least one from a group of: a zero volt and a known non-zero DC voltage, one or more DC voltages.

11. The squaring circuit of claim 1 wherein the squaring circuit exhibits substantially constant gain from DC to radio frequencies.

12. An integrated circuit comprising the squaring circuit of claim 1.

13. The integrated circuit of claim 12 further comprising a temperature stable buffer operably coupled to an offset and gain calibration control circuit arranged to provide differential input signals to the squarer circuit, wherein the temperature stable buffer is configured to provide a buffered temperature stable signal to the offset and gain calibration control circuit.

14. A wireless communication unit comprising the squaring circuit of claim 1.

15. The wireless communication unit of claim 14 further comprising a transmit path and a feedback path operably coupled to the transmit path and arranged to feed back a portion of a radio frequency (RF) transmit signal on the transmit path, wherein the feedback path comprises a temperature stable buffer operably coupled to an offset and gain calibration control circuit arranged to provide differential input feedback signals to the squarer circuit, wherein the temperature stable buffer is configured to provide a buffered temperature stable feedback signal to the offset and gain calibration control circuit.

16. The wireless communication unit of claim 15 further comprising an analogue-to-digital converter and a signal processor operably coupled to the analogue-to-digital converter and arranged to perform an averaging operation and square root calculation on the squared fed back signal to determine a root mean square (RMS) input voltage level.

* * * * *